United States Patent
Nakayama et al.

(10) Patent No.: US 10,236,496 B2
(45) Date of Patent: Mar. 19, 2019

(54) WIRING MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Osamu Nakayama, Mie (JP); Ryouya Okamoto, Mie (JP); Seishi Kimura, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 98 days.

(21) Appl. No.: 15/524,693

(22) PCT Filed: Nov. 24, 2015

(86) PCT No.: PCT/JP2015/082822
§ 371 (c)(1),
(2) Date: May 5, 2017

(87) PCT Pub. No.: WO2016/084760
PCT Pub. Date: Jun. 2, 2016

(65) Prior Publication Data
US 2018/0309113 A1    Oct. 25, 2018

(30) Foreign Application Priority Data
Nov. 25, 2014 (JP) .................................. 2014-237396

(51) Int. Cl.
| | |
|---|---|
| H01M 2/34 | (2006.01) |
| H01M 10/48 | (2006.01) |
| G01K 1/14 | (2006.01) |
| H01M 2/06 | (2006.01) |

(52) U.S. Cl.
CPC .............. H01M 2/348 (2013.01); G01K 1/14 (2013.01); H01M 2/06 (2013.01); H01M 10/486 (2013.01)

(58) Field of Classification Search
None
See application file for complete search history.

(56) References Cited

U.S. PATENT DOCUMENTS

| | | | |
|---|---|---|---|
| 5,319,356 A * | 6/1994 | Yoshino | ................... G01K 1/16 174/68.2 |
| 2013/0224564 A1* | 8/2013 | Kim | ...................... H01M 2/206 429/158 |

(Continued)

FOREIGN PATENT DOCUMENTS

| | | |
|---|---|---|
| CN | 103811706 | 2/2016 |
| JP | 2013-143181 | 7/2013 |

(Continued)

OTHER PUBLICATIONS

U.S. Appl. No. 15/507,511 to Naoki Fukushima et al., filed Feb. 28, 2017.

(Continued)

*Primary Examiner* — Scott J. Chmielecki
(74) *Attorney, Agent, or Firm* — Greenblum & Bernstein, P.L.C.

(57) ABSTRACT

A wiring module to be attached to a unit battery group in which a plurality of unit batteries, each having a positive and a negative electrode terminal, are arranged side by side, the wiring module including: a bus bar that overlaps the electrode terminals and electrically connects adjacent electrode (Continued)

terminals; a temperature detection member having a plate-shaped detection portion that overlaps the bus bar, and detects the temperature of the bus bar; an insulating protector holding the bus bar and the temperature detection member; and a cover covering at least a portion of the insulating protector. The detection portion overlaps a region of the bus bar other than a region of the bus bar that overlaps the electrode terminals, and a pressing rib that presses the detection portion toward the bus bar in a state where the cover is covering the insulating protector is provided on the cover.

8 Claims, 8 Drawing Sheets

(56) References Cited

U.S. PATENT DOCUMENTS

| | | | |
|---|---|---|---|
| 2013/0302662 A1* | 11/2013 | Ogasawara | H01M 2/206 429/158 |
| 2013/0330595 A1* | 12/2013 | Lee | H01M 2/1016 429/159 |
| 2014/0141301 A1* | 5/2014 | Aoki | H01M 10/482 429/90 |
| 2015/0147613 A1* | 5/2015 | Hayashida | H01M 2/1072 429/90 |
| 2016/0021772 A1* | 1/2016 | Nakayama | H01M 2/206 361/728 |
| 2017/0324225 A1* | 11/2017 | Nakayama | H01M 2/202 |
| 2018/0006288 A1* | 1/2018 | Nakayama | H01M 2/206 |

FOREIGN PATENT DOCUMENTS

| | | |
|---|---|---|
| JP | 2014-503934 | 2/2014 |
| JP | 2014-093218 | 5/2014 |
| JP | 2014-514715 | 6/2014 |

OTHER PUBLICATIONS

Search Report issued in International Bureau of WIPO Patent Application No. PCT/JP2015/082822, dated Feb. 16, 2016.

* cited by examiner

WIRING MODULE

TECHNICAL FIELD

The technology disclosed in the present specification is related to a wiring module.

BACKGROUND ART

In power storage modules for electric automobiles and hybrid vehicles, a plurality of power storage elements are connected side by side in order to increase the output. The power storage elements are connected in series or parallel by connecting adjacent electrode terminals to each other with a connecting member such as a bus bar.

The lifetime of this type of power storage module may decrease if it is used in a high temperature environment, and in the case of a power storage module in which lithium ion cells or the like are connected together, excessively high temperatures may be reached during charging. In view of this, in order to avoid such situations, a temperature sensor for detecting the temperature of a power storage element is attached to the power storage module.

As a temperature sensor, there are sensors that include a flat plate-like detection portion that is arranged to overlap a bus bar and a voltage detection terminal or the like that overlaps the bus bar, and that have an insertion hole formed in the detection portion. A configuration is employed in which the temperature sensor is thermally attached to a power storage element by inserting, into the insertion hole, an electrode post of an electrode terminal or alternatively, a bolt that fastens to a hole portion of the electrode terminal, and fastening the temperature sensor together with the bus bar or the voltage detection terminal when they are fastened and connected to the electrode terminal.

CITATION LIST

Patent Documents

Patent Document 1: JP 2014-191954A

SUMMARY OF INVENTION

Technical Problem

In recent years, a method of connecting a bus bar and an electrode terminal using laser welding instead of using a fastener such as a bolt or nut has been proposed. However, if such a connection method is employed, a fastening member dedicated for the temperature sensor is needed to fix the temperature sensor with the foregoing configuration to a bus bar, and the number of parts increases and separate fixing work is required.

The technology disclosed in the present specification was achieved in light of situations such as those described above, and it is an object of the present invention to provide a wiring module with fewer parts and fewer work steps.

Solution to Problem

In order to solve the above described issues, the technology disclosed in the present specification is a wiring module that is to be attached to a power storage element group in which a plurality of power storage elements, each having a positive and a negative electrode terminal, are arranged side by side, the wiring module including: a bus bar that overlaps the electrode terminals and electrically connects adjacent electrode terminals; a temperature detection member that has a plate-shaped detection portion that overlaps the bus bar, and detects a temperature of the bus bar; an insulating protector that holds the bus bar and the temperature detection member; and a cover that covers at least a portion of the insulating protector, wherein the detection portion overlaps a region of the bus bar other than a region of the bus bar that overlaps the electrode terminals, and a pressing portion that presses the detection portion toward the bus bar in a state where the cover is covering the insulating protector is provided on the cover.

With the above-described configuration, starting from a state in which the detection portion of the temperature detection member has been arranged so as to overlap a bus bar held by an insulating protector, when the insulating protector is covered by the cover, the pressing portion provided on the cover presses the detection portion of the temperature detection member toward the bus bar. Accordingly, there is no need to newly provide a fastening member to fix the temperature detection member to the bus bar, or to separately perform fixing work, and a wiring module with fewer parts and fewer work steps can be provided.

The above described wiring module may be configured as described below.

A configuration may be employed wherein, in a state where the cover covers the insulating protector, the cover covers the detection portion and exposes the region of the bus bar that overlaps the electrode terminals to the outside.

If such a configuration is employed, a state where the detection portion is held down by the pressing portion of the cover so as not to shift relative to the bus bar is maintained, and at the portion where the bus bar is exposed, the bus bar and the electrode terminals can be connected to each other through laser welding or the like.

The cover may be provided integrated with the insulating protector via a hinge portion.

If such a configuration is employed, the number of parts can be further reduced.

A lock-target portion that is to be locked to the insulating protector may be provided on the cover.

If such a configuration is employed, the cover is locked to the insulating protector, and therefore the state in which the temperature detection member is restricted from moving can be maintained.

Advantageous Effects of Invention

According to the technology disclosed in the present specification, a wiring module that includes a temperature detection member, has fewer parts, and requires fewer work steps is obtained.

DESCRIPTION OF EMBODIMENTS

An embodiment in which a wiring module 20 described in the present specification is applied to a battery module M will be described with reference to FIGS. 1 to 9.

The battery module M of the present embodiment is mounted in vehicles such as electric automobiles and hybrid automobiles (not shown), and is used as a power source to drive the vehicle. The battery module M includes a unit battery group 10 (an example of a power storage element group) in which a plurality of unit batteries 11 (an example of a power storage element) are arranged side by side, and the wiring module 20 that is attached to the unit battery group 10 (see FIG. 8).

In the following description, in FIG. 8, the lower side is the front side and the upper side is the rear side (back side). Also, in FIG. 9, the upper side is the top side and the lower side is the bottom side. Only some identical members are denoted by reference signs, and reference signs may be omitted for other identical members.

Unit Battery Group 10

Figure 1:
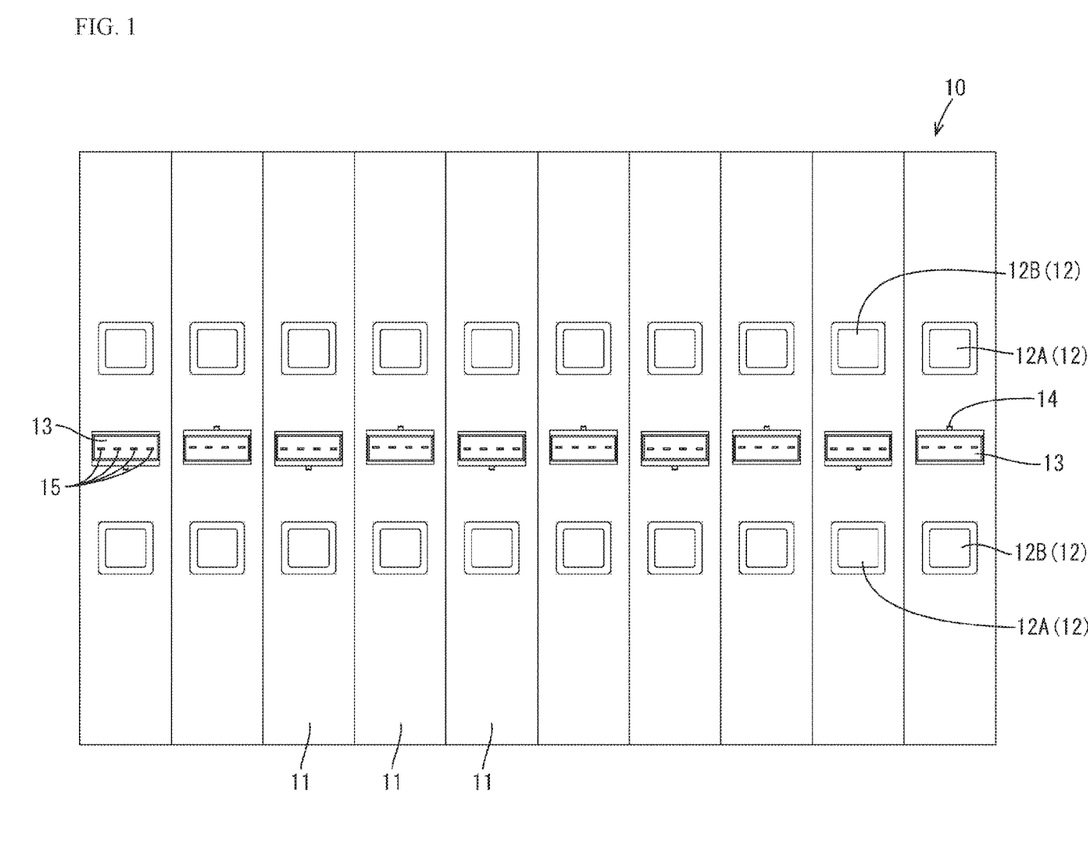
FIG. 1 is a plan view of a unit battery group according to an embodiment.

The battery module M of the present embodiment has the unit battery group 10 in which a plurality of unit batteries 11, which are each formed by four unit batteries (not shown) connected in series, are arranged side by side (see FIG. 1). In the present embodiment, power generating elements (not shown) are accommodated in the unit batteries.

The unit batteries 11 of the present embodiment each have a flattened and substantially rectangular parallelepiped shape. A positive electrode terminal 12A and a negative electrode terminal 12B are formed protruding upwards on the upper face of the unit battery 11, at positions toward the respective end portions in the longitudinal direction. The positive electrode terminal 12A and the negative electrode terminal 12B have the same shape and size. Each of the electrode terminals 12A and 12B is formed in a square column shape, and the upper face thereof is made into a flat electrode surface. The plurality of unit batteries 11 constitute the unit battery group 10 by being arranged so that adjacent electrode terminals 12 have different polarities. Adjacent unit batteries 11 are electrically connected by a bus bar 21 that will be described later.

Figure 9:
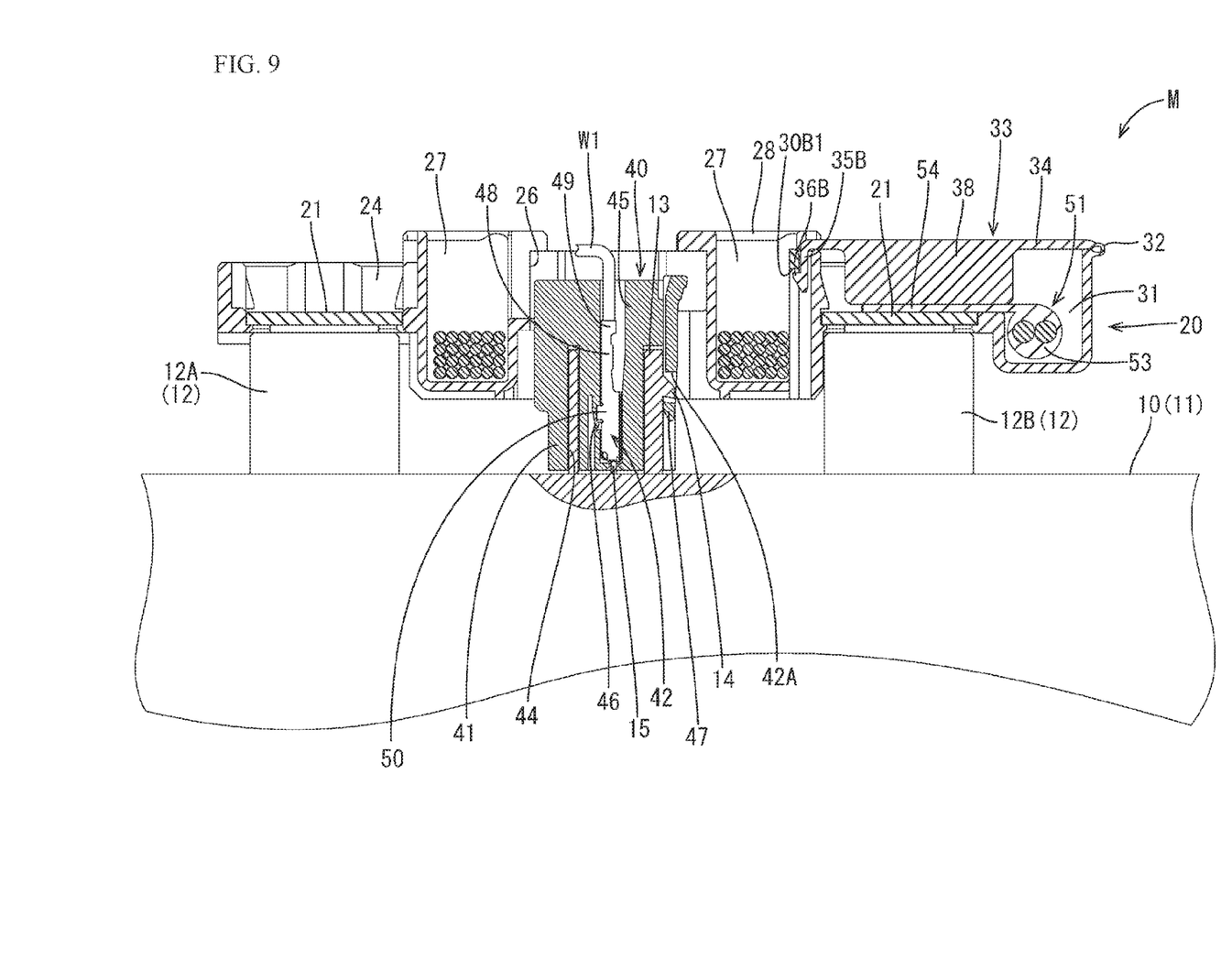
FIG. 9 is a cross-sectional view taken along line C-C in FIG. 8.

As shown in FIG. 1 and FIG. 9, a tubular connector portion 13, which is open upward, is formed between the positive and negative electrode terminals 12A and 12B. A locking protrusion 14 that locks a partner connector 40 is formed on the outer wall of each of the connector portions 13.

Four male terminals 15 connected to the unit batteries are arranged protruding in the connector portions 13. These four terminals 15 are to be electrically connected to terminals 47 of the partner connector 40.

Wiring Module 20

The wiring module 20 includes a plurality of bus bars 21, which are made of metal, that are connected to the positive electrode terminals 12A and the negative electrode terminals 12B of adjacent unit batteries 11, an insulating protector 23 that is made of an insulating material and has bus bar holding portions 24 for holding the bus bars 21, and temperature detection members 51 that detect the temperature of the bus bars 21.

Bus Bar 21

Figure 4:
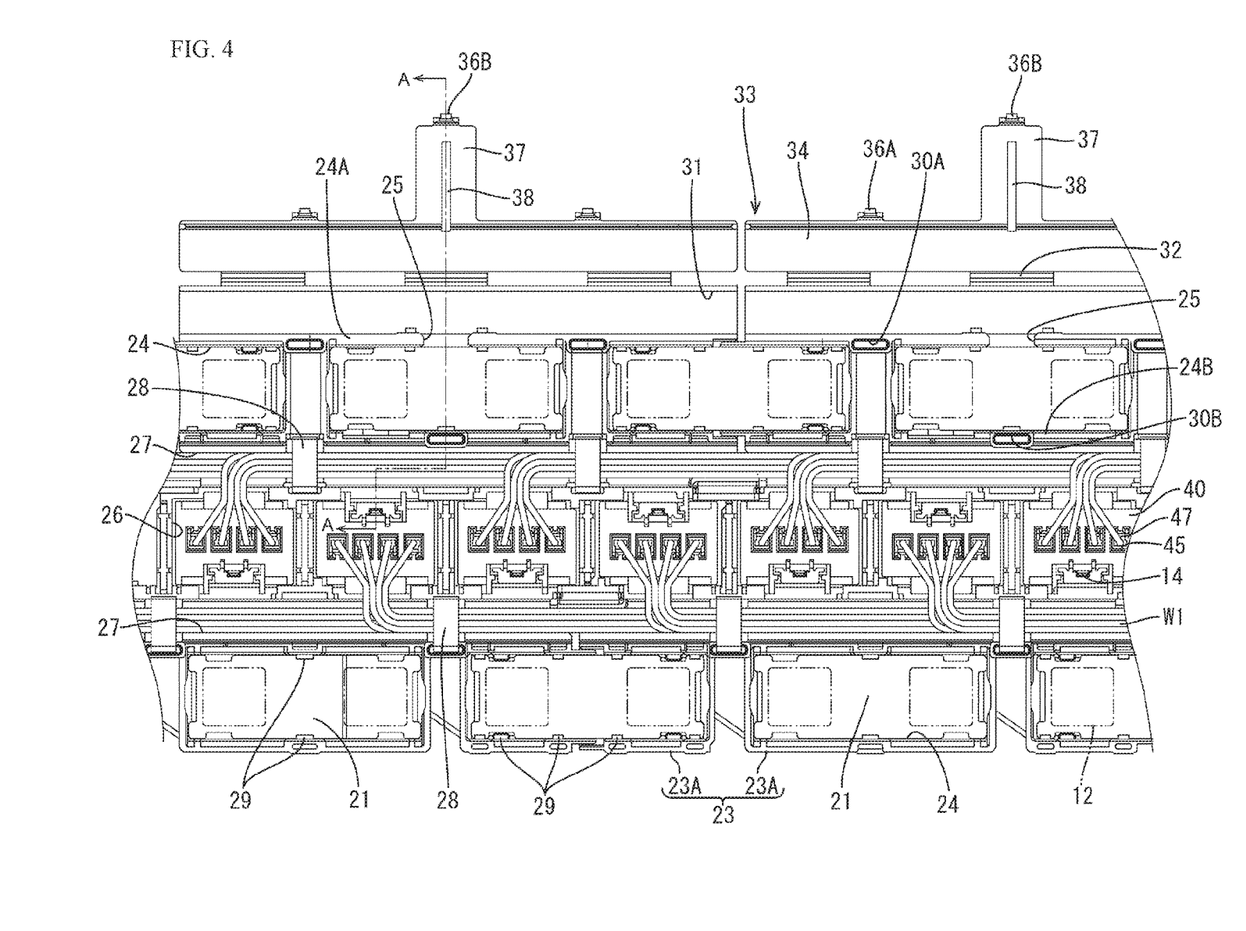
FIG. 4 is a plan view of a wiring module before the temperature detection member has been arranged.

The bus bars 21 are each formed by pressing a metal plate member, which is made of copper, a copper alloy, stainless steel (SUS), aluminum, or the like, into a predetermined shape, and have an approximately rectangular shape overall as shown in FIG. 4, for example.

Insulating Protector 23

Figure 8:
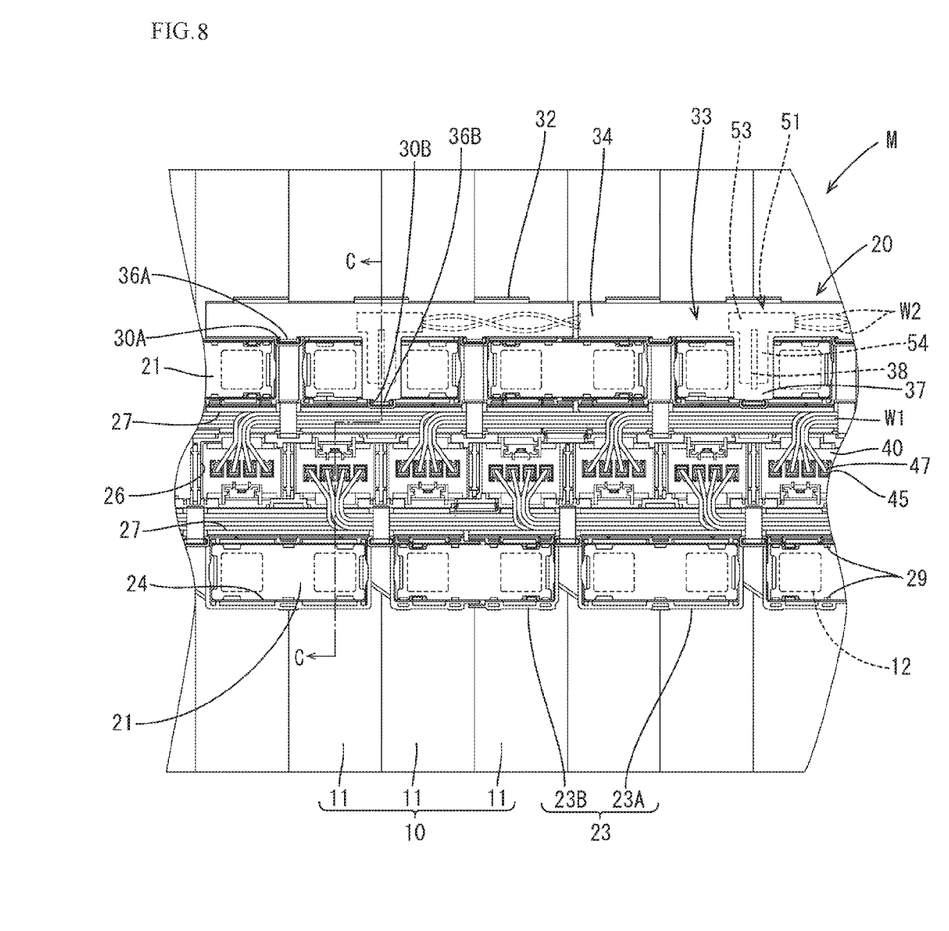
FIG. 8 is a plan view of a battery module in a completed aspect.

The insulating protector 23 is formed by coupling a plurality of coupling units 23A, and as shown in FIG. 8, has a shape that is elongated in the alignment direction (left-right direction in FIG. 8) of the unit batteries 11. A plurality of bus bar holding portions 24 that are open upward and have partition walls that partition the bus bar holding portion 24 off from the outside and can hold a bus bar 21 are provided arranged in two rows in the insulating protector 23, running along the longitudinal direction thereof. A plurality of pressing pieces 29 that prevent the bus bar 21 from coming out upward are provided in each of the bus bar holding portions 24.

Out of the bus bar holding portions 24 arranged in two rows, an outer wall 24A of a bus bar holding portion 24 arranged on the back side (upper side in FIG. 4) has a portion that is cut out that acts as a pass-through portion 25 through which a later-described detecting portion 54 of the temperature detection member 51 is to be passed. The pass-through portion 25 is provided at the center (a position corresponding to a position between adjacent electrode terminals 12 in a state where the wiring module 20 is attached to the unit battery group 10) of the outer wall 24A of a predetermined bus bar holding portion 24 in the extending direction thereof.

The width dimension of the pass-through portion 25 is set to be the same as or slightly larger than the width dimension of the later-described detecting portion 54 of the temperature detection member 51. Also, a bottom portion 25A of the pass-through portion 25 is set to a height that is on the same plane as the upper face of the bus bars 21 in a state where the bus bars 21 are placed in the bus bar holding portions 24 (see FIG. 5).

Also, as shown in FIG. 4, a receiving groove 31 that receives a later-described element accommodating portion 53 of the temperature detection member 51 is formed outward of the bus bar holding portions 24 that are arranged on the back side.

Figure 6:
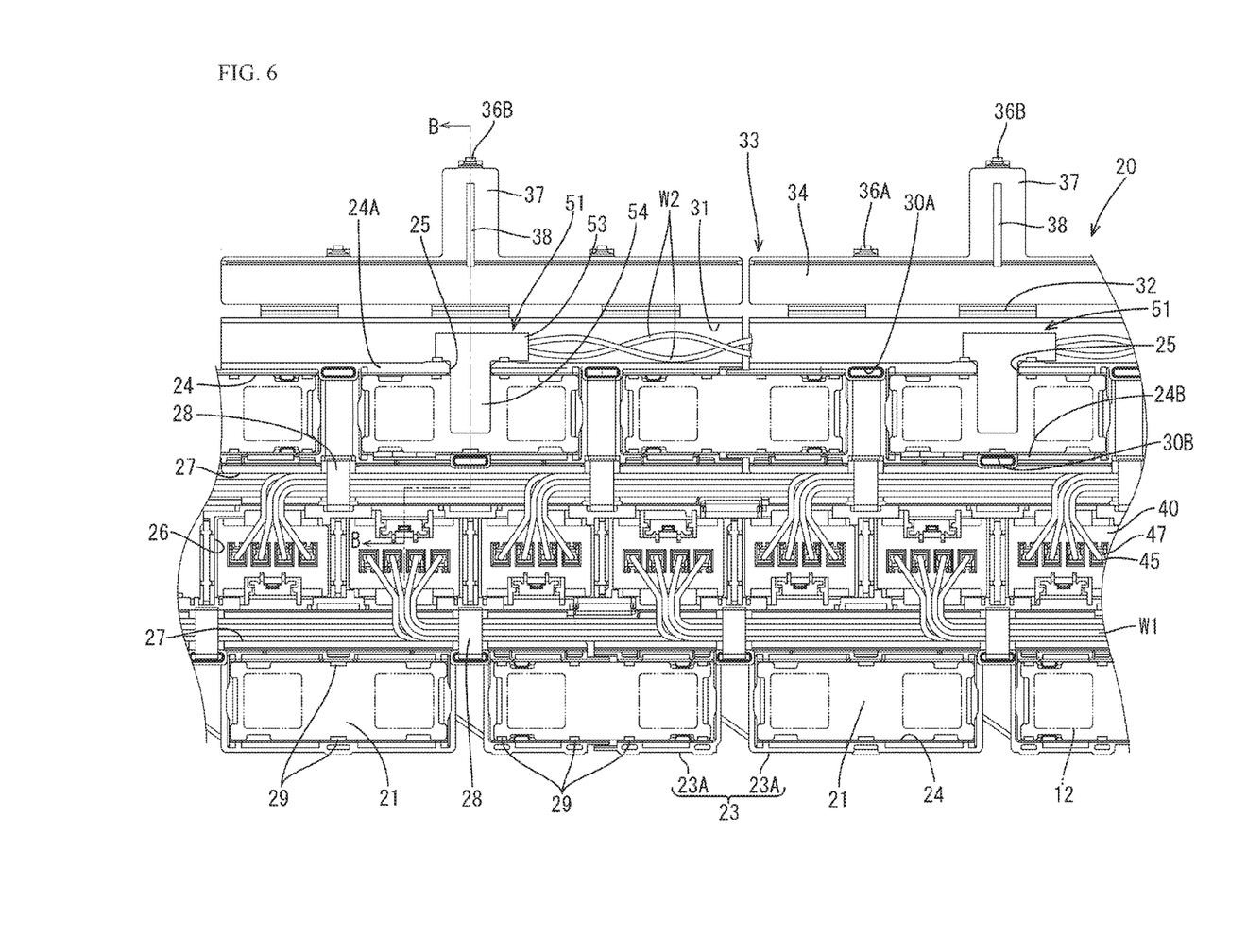
FIG. 6 is a plan view of the wiring module in a state where the temperature detection member has been arranged.
Figure 7:
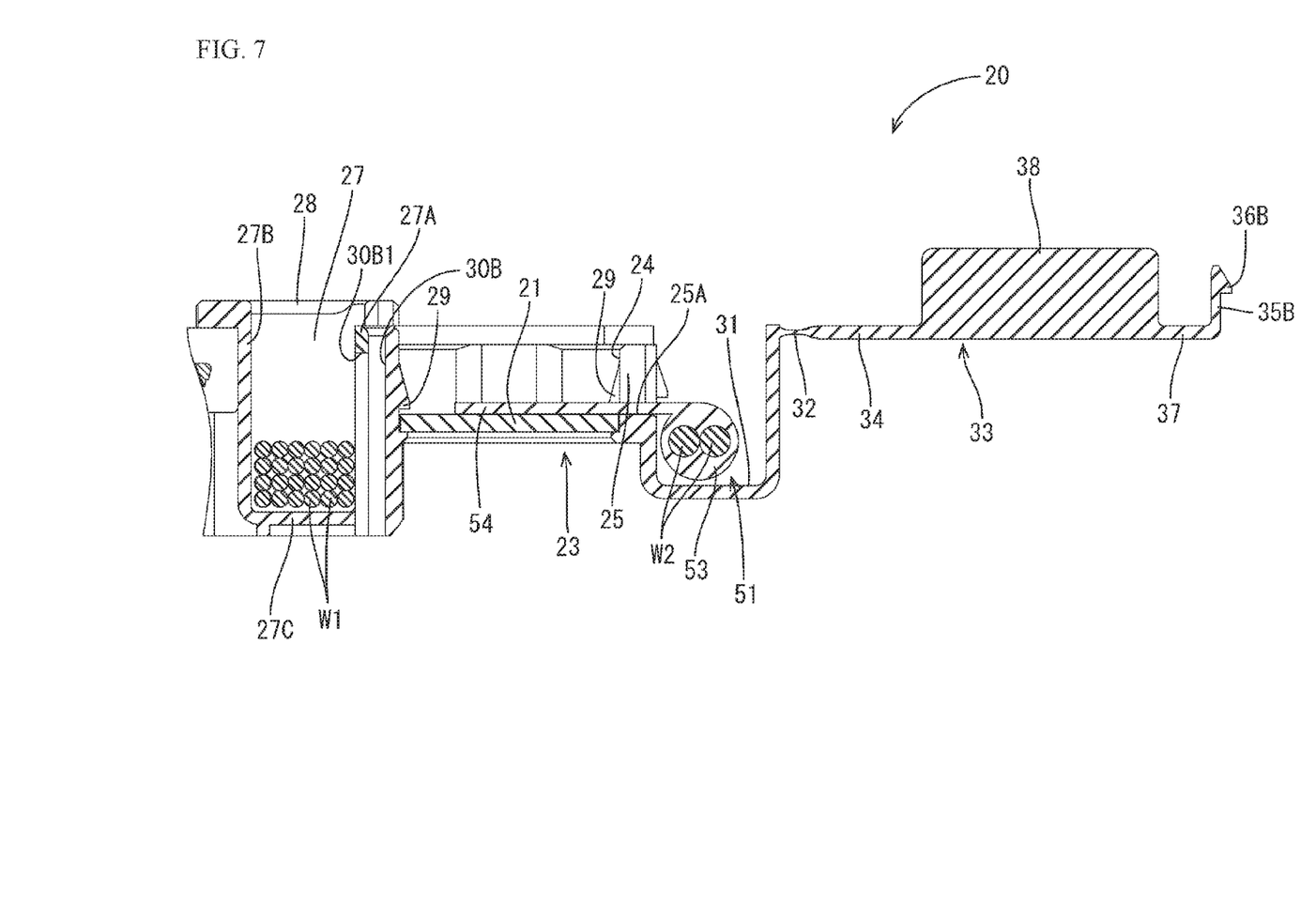
FIG. 7 is a partially enlarged cross-sectional view taken along line B-B in FIG. 6.

The receiving groove 31 is formed extending in the alignment direction (left-right direction in FIG. 4) of the plurality of bus bar holding portions 24. As shown in FIG. 6, the later-described element accommodating portion 53 of the temperature detection member 51 and electric wires W2 that extend out from the element accommodating portion 53 are arranged in the receiving groove 31. The top of the receiving groove 31 is open.

Also, out of the bus bar holding portions 24 arranged in two rows, a first cover locking hole 30A that locks a cover 33, which is described later, is provided on the outer wall 24A of the bus bar holding portion 24 arranged on the back side so as to be between adjacent bus bar holding portions 24, and a second cover locking hole 30B that likewise locks the cover 33 is provided on an inner wall 24B, at the center of one of the bus bar holding portions 24 in the length direction (left-right direction) thereof. A first locking portion (not shown) and a second locking portion 30B1 are respectively provided on the hole walls of the first cover locking hole 30A and the second cover locking hole 30B, the first locking portion (not shown) and the second locking portion 30B1 respectively receiving a later-described first lock piece (not shown) and a first lock protrusion 36A (an example of a lock-target portion) and a second lock protrusion 36B (an example of a lock-target portion) of a second lock piece 35B, which are provided on the cover 33 side (see FIG. 9).

A connector holding portion 26 is provided between the bus bar holding portions 24 arranged in two rows, and electrical wire accommodating grooves 27 are provided between the connector holding portion 26 and the bus bar holding portions 24.

The electrical wire accommodating grooves 27 accommodate electrical wires W1 that are connected to end portions of the terminals 47 placed in a terminal accommodating portion 45 of a connector 40 held by the connector holding portion 26.

Figure 5:
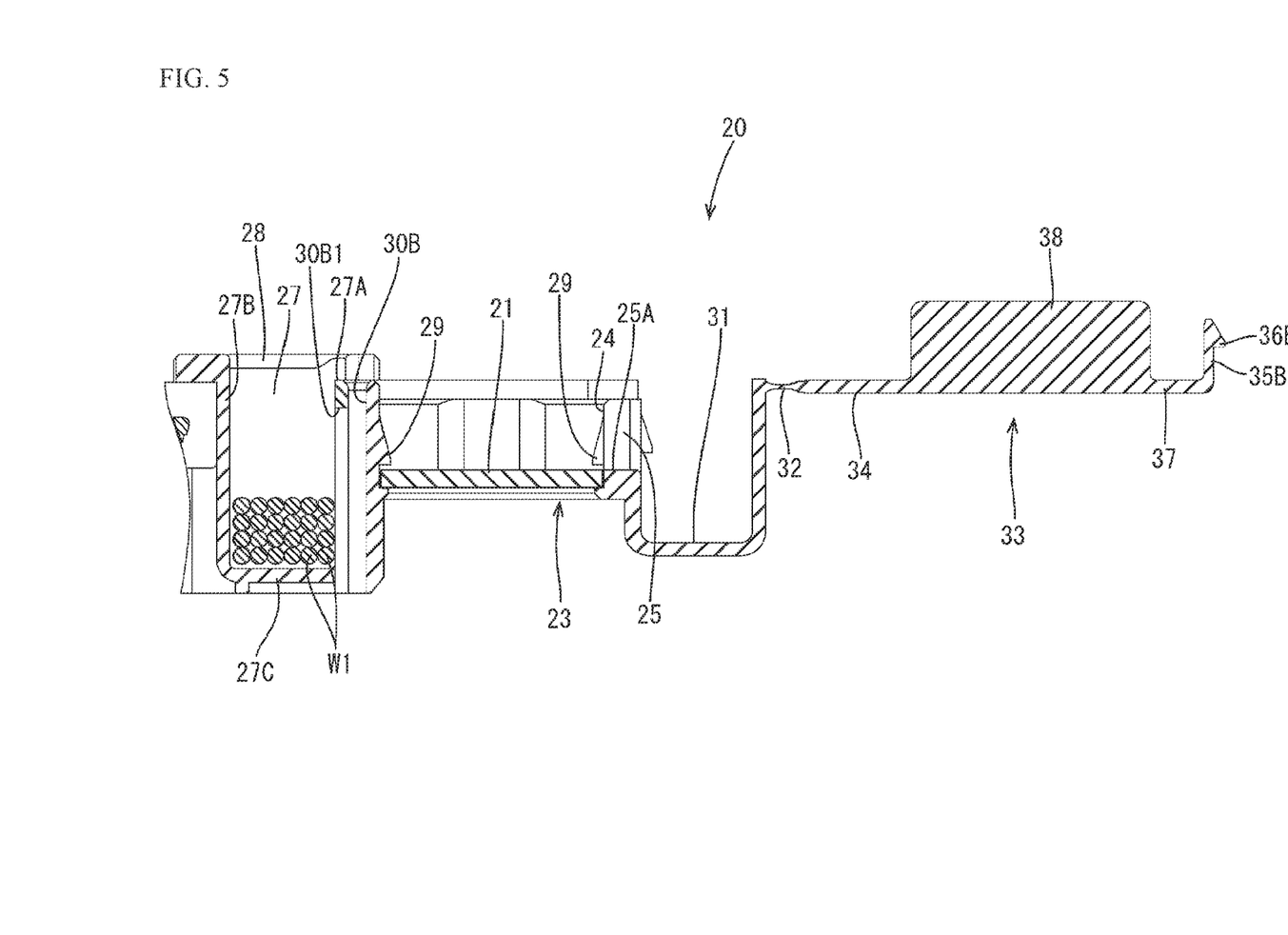
FIG. 5 is a partially enlarged cross-sectional view taken along line A-A in FIG. 4.

As shown in FIG. 5, the two electrical wire accommodating grooves 27 have a pair of groove walls 27A and 27B and a bottom portion 27C that joins them, and can accommodate a plurality of electrical wires W1.

Also, an electrical wire fixing portion 28 that restricts the electrical wires W1 from coming out of the electrical wire accommodating groove 27 is provided on the upper end edge of the electrical wire accommodating groove 27 to span from the one groove wall 27A to the other groove wall 27B. The electrical wire fixing portion 28 is provided between adjacent bus bar holding portions 24.

In the present embodiment, the connector holding portion 26 is provided between the two electrical wire accommodating grooves 27. The connector holding portion 26 has a shape that extends along the outer circumference of the connectors 40.

Cover 33

In the present embodiment, the cover 33 is provided to cover a portion of the insulating protectors 23. In the present embodiment, the cover 33 is integrated with the insulating protectors 23 (groove wall of receiving groove 31) via hinges 32. Similarly to the insulating protectors 23, the cover 33 is made of an insulating material.

The cover 33 has a main body portion 34 that extends in the extending direction (left-right direction in FIG. 4) of the receiving groove 31 and covers the opening of the receiving groove 31 from above, and an extension portion 37, which is formed extending in a direction (front-back direction) orthogonal to the extending direction of the receiving groove 31, is provided at a portion of the main body portion 34 that corresponds to the pass-through portion 25 of the insulating protector 23. The extension dimension of the extension portion 37 from the main body portion 34 is set to a dimension that is approximately the same as the width dimension (dimension in up-down direction in FIG. 4) of the bus bar holding portion 24. Also, the width dimension of the extension portion 37 is set to a dimension that is larger than the width dimension of the pass-through portion 25 and the detecting portion 54.

A pressing rib 38 (an example of a pressing portion) that extends in a direction orthogonal to the extending direction of the receiving groove 31 is formed so as to protrude on the inner face side (lower face side) of the extension portion 37 in a state where the cover 33 is closed.

As shown in FIG. 9, in a state where the cover 33 is closed (a state where the main body portion 34 covers the receiving groove 31), the pressing rib 38 is set to a protrusion dimension at which it presses the detecting portion 54 of the temperature detection member 51 overlapping the bus bar 21 toward the bus bar 21 from above. Also, the length dimension of the pressing rib 38 is set to a larger dimension than the length dimension of the detecting portion 54, and an end portion of the pressing rib 38 protrudes outward past the front end portion of the detecting portion 54 in a state where the pressing rib 38 is pressing the detecting portion 54.

Also, in a state where the cover 33 is closed, a first lock piece 35A that has the first lock protrusion 36A (an example of a lock-target portion) to be locked to the unshown first locking portion of the first cover locking hole 30A is formed protruding on an edge portion of the main body portion 34 at a position that corresponds to the first cover locking hole 30A of the insulating protector 23 described above.

Furthermore, the second lock piece 35B that has the second locking protrusion 36B to be locked to the second locking portion 30B1 of the second cover locking hole 30B of the insulating protector 23 described above is formed protruding on the front end of the extension portion 37.

Assuming a state where the cover 33 is closed, the cover 33 is held in a state where it will not open due to the first lock protrusion 36A being locked to the unshown first locking portion and the second lock protrusion 36B being locked to the second locking portion 30B1.

Also, in a state where the cover 33 is closed, the temperature detection member 51 (detecting portion 54) is entirely covered by the extension portion 37, and the region of the bus bar 21 that overlaps the electrode terminals 12 is exposed to the outside.

Connector 40

The connectors 40 held by the connector holding portion 26 each accommodate the four terminals 47 as shown in FIG. 8, for example. The connectors 40 each include a substantially rectangular parallel piped housing 41 and the four terminals 47 that are placed in the housing 41.

As shown in FIG. 9, a locking piece 42 that is locked to the unit battery 11 by receiving the locking protrusion 14 of the connector portion 13 is formed in the housing 41. A locking hole 42A into which the locking protrusion 14 is fitted is formed in the locking piece 42.

A groove portion 44 that receives the connector portion 13 is formed in the housing 41. Four terminal accommodating portions 45 are formed in parallel in each of the housings 41. A lance 46 is formed, on the inner circumferential surface of the terminal accommodating portions 45, so as to be able to flex and protrude inward of the terminal accommodating portion 45 to engage with a terminal 47 placed in the terminal accommodating portion 45

The terminals 47 placed in the housing 41 are so-called female terminals 47, in which barrel portions 48 and 49 connected to an electrical line W1 are formed on an end portion (upper end portion in FIG. 9) of the terminals 47, and the other end portion (lower end portion in FIG. 9) is box-like and formed having a connecting portion 50 that can be connected to a unit battery.

The barrel portions 48 and 49 are not shown in detail, but have the wire barrel portion 48 that is crimped to the exposed core wire (not shown) exposed at the terminal of an electric wire W1, and the insulation barrel portion 49 that is crimped to the portion coated by the insulating coating of the electric wire W1.

An unshown elastic contact piece is formed on the connecting portion 50, and when the elastic contact piece and a terminal 15 of the connector portion 13 come into contact with each other, the unit batteries and the terminals 47 of the connector 40 are electrically connected to each other. Also, an engaging portion (not shown) that engages with the lance 46 is formed between the connecting portion 50 of a terminal 47 and the barrel portions 48 and 49.

The terminals 47 accommodated in the connector 40 are the terminals 47 that detect the voltage of the unit batteries. The electrical wires W1 connected to the terminals 47 extend out of the housing 41 from the terminal accommodating portion 45, are arranged in the electrical line accommodating groove 27 on the side opposite to the locking piece 42 of the housing 41, extend out of the battery module M, and are connected to a control unit (not shown) such as an ECU.

Temperature Detection Member 51

Figure 2:
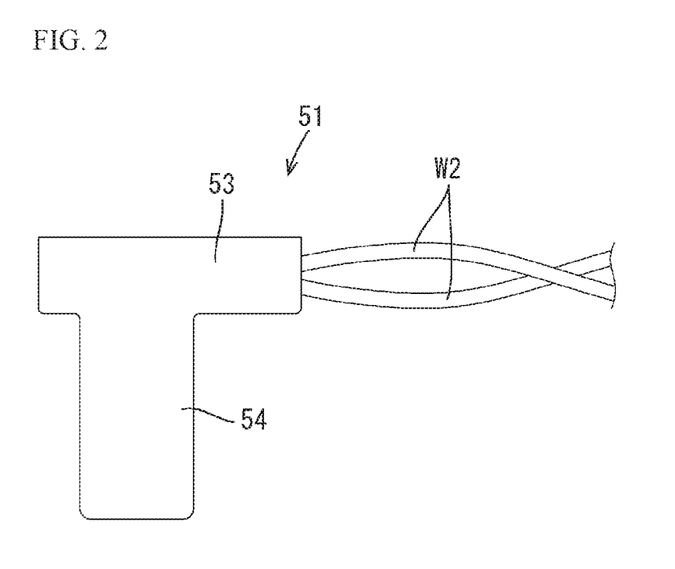
FIG. 2 is a plan view of a temperature detection member.
Figure 3:
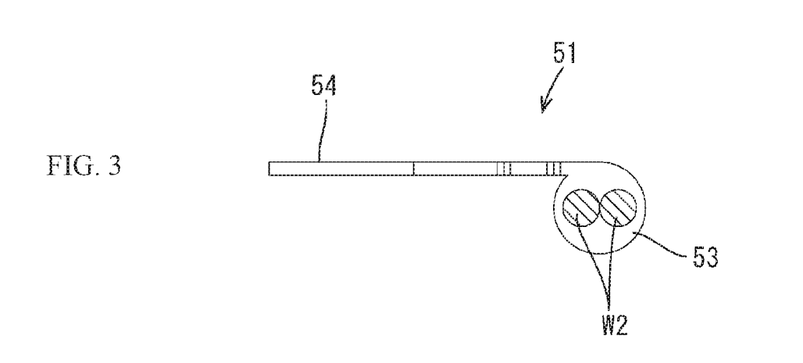
FIG. 3 is a side view of the same.

As shown in FIG. 2 and FIG. 3, the temperature detection member 51 has the element accommodating portion 53 that accommodates the unshown temperature detection element and from which the electrical wires W2 extend out, and the detecting portion 54.

The element accommodating portion 53 is tubular in shape, and the temperature detection element, to which the electrical wires W2 are connected, is placed in the element accommodating portion 53. The temperature detection element is constituted by a thermistor, for example. A PTC thermistor or an NTC thermistor can be appropriately selected as the thermistor. Also, the temperature detection element is not limited to being a thermistor, and it is possible to appropriately select any element as long as it can perform temperature detection.

A pair of electrical wires W2 are connected to the temperature detection element and extend out from the element accommodating portion 53 toward the outside. The electrical wires W2 are connected to an external circuit that is not shown, and signals from the temperature detection element are transmitted to the external circuit via the electrical wires W2. The external circuit is arranged on a battery ECU that is not shown, for example, and detects the temperature of the bus bar 21 based on a signal from the temperature detection element.

The detecting portion 54 has a flat plate shape that extends in a perpendicular direction from the approximate center in the extending direction of the element accommodating portion 53, and the temperature detection member 51 has an approximate T shape overall in plan view. The detecting portion 54 is placed on the bus bar 21 described above and comes into surface contact with the bus bar 21. The width dimension (dimension in left-right direction in FIG. 2) of the detecting portion 54 is set to be the same as or slightly smaller than the width dimension of the pass-through portion 25 described above.

As shown in FIG. 3, the element accommodating portion 53 has a larger thickness dimension than the detecting portion 54. Also, the upper face of the element accommodating portion 53 is on the same plane as the upper face of the detecting portion 54.

The temperature detection member 51 of the present embodiment is produced by pressing a plate member made of a metal such as copper, a copper alloy, stainless steel (SUS), aluminum, or the like. The temperature detection member 51 is produced by a method in which, for example, the tubular element accommodating portion 53 is formed by pressing a metal plate member into a predetermined shape and then performing bending processing or the like on it, the temperature detection element that is connected to the electrical wires W2 is inserted into the element accommodating portion 53, and then an insulating resin (e.g., epoxy resin) is poured into the element accommodating portion 53 and allowed to cure.

Wiring Module 20 Assembly Method

When assembling the wiring module 20 of the present embodiment, first the bus bars 21 are placed in the bus bar holding portions 24 of the insulating protector 23. The bus bars 21 placed in the bus bar holding portions 24 are locked by the pressing pieces 29 at the edge portions of the bus bars 21 and prevented from coming out upward.

Next, the terminals 47 to which the electrical wires W1 are connected to an end portion thereof are placed in the terminal accommodating portion 45 of the connector 40, and the connector 40 is fitted into the connector holding portion 26 and attached to the connector holding portion 26.

Then, the electrical wires W1 connected to the connector 40 are placed in the electrical wire accommodating groove 27 (see FIG. 4 and FIG. 5). At the time of placing the electrical wires W1, they are placed in the electrical wire accommodating groove 27 on the side opposite to the locking piece 42 provided in the housing 41 of the connector 40 to which the electrical wires W1 are connected.

Next, the temperature detection member 51 is placed in a predetermined bus bar holding portion 24 of the insulating protector 23. Specifically, the base end portion of the detecting portion 54 of the temperature detection member 51 is fitted into the pass-through portion 25 of the insulating protector 23 and arranged so that the detection portion 54 overlaps the bus bar 21, and the element accommodating portion 53 is placed in the receiving groove 31. Accordingly, the detecting portion 54 and the bus bar 21 come into surface contact with each other. The electrical wires W2 connected to the temperature detection element are routed in the receiving groove 31 (see FIG. 6 and FIG. 7).

Then, the cover 33 is folded over at the hinges 32 to cover the open portion of the receiving groove 31 with the main body portion 34, and the bus bar holding portion 24 is partially covered by the extension portion 37. At this time, the first lock piece 35A of the cover 33 flexes and deforms outward when the first lock protrusion 36A abuts against the hole edge of the first cover locking hole 30A, and elastically returns when the first lock protrusion 36A reaches the unshown first locking portion in the first cover locking hole 30A. Accordingly, the first lock protrusion 36A is locked to the first locking portion. Also, the second lock piece 35B flexes and deforms outward when the second lock protrusion 36B abuts against the hole edge of the second cover locking hole 30B, and elastically returns when the second lock protrusion 36B reaches the second locking portion 30B1 in the second cover locking hole 36B. Thus, the second lock protrusion 36B is locked to the second locking portion 30B1.

In this way, the cover 33 is held in a state of being closed on the insulating protector 23, and the detecting portion 54 of the temperature detection member 51 is in a state of being pressed toward the bus bar 21 by the pressing rib 38 (see FIG. 8 and FIG. 9). Accordingly, the temperature detection member 51 and the bus bar 21 are connected in a manner in which heat is transferred. As a result, heat generated by the unit battery 11 charging or discharging is transferred from the electrode terminals 12 to the bus bar 21, and transferred from the bus bar 21 to the temperature detection member 51.

Note that, in this state, the temperature detection member 51 (detecting portion 54) is entirely covered by the extension portion 37, and the region of the bus bar 21 that overlaps the electrode terminals 12 is exposed to the outside.

Method of Mounting to Unit Battery Group 10

Next, as described above, the wiring module 20 in which the temperature detection members 51, the bus bars 21, and the connectors 40 are arranged in the insulating protectors 23 is attached at predetermined positions on the electrode surfaces of the unit battery group 10 in which adjacent electrode terminals 12A and 12B have been arranged to have different polarities. In doing so, both end portions of the bus bars 21 that are not covered by the extension portion 37 of the cover 33 are arranged overlapping the upper faces of the electrode terminals 12A and 12B of the unit battery 11. Also, the connector portions 13 of the unit battery 11 are arranged below the connectors 40 arranged in the connector holding portion 26.

Next, laser welding is performed at each portion where a bus bar 21 and an electrode terminal 12 overlap, and the bus bars 21 and the electrode terminals 12 are electrically connected. Then, each of the connectors 40 are pressed down to electrically connect the connectors 40 to a unit battery Accordingly, the battery module M is complete (see FIG. 8 and FIG. 9).

Actions and Effects of Present Embodiment

In the present embodiment, starting from a state where the detecting portions 54 of the temperature detection members 51 are arranged overlapping the bus bars 21 held by the bus bar holding portions 24, when the cover 33 is closed, the pressing rib 38 provided on the cover 33 presses the detecting portion 54 toward the bus bar 21.

Thus, a fastening member for attaching the temperature detection members 51 to the bus bars 21 does not have to be provided separately and fixing work does not have to be separately performed, and the temperature detection member 51 can be held in a state of being thermally attached to the bus bar 21 by merely closing the cover 33.

Also, a configuration is employed where, in a state where the cover 33 is covering the insulating protector 23, the entire detecting portion 54 is covered by the extension portion 37 whereas the region of the bus bar 21 that overlaps the electrode terminals 12 is exposed to the outside. Thus, a state where the detecting portion 54 is held down by the pressing rib 38 so as not to shift relative to the bus bar 21 is maintained, and at the portion where the bus bar 21 is exposed, the bus bar 21 and the electrode terminals 12 can be connected to each other through laser welding or the like.

Also, according to the present invention, the cover 33 is provided integrated with the insulating protector 23, and therefore, when the cover 33 is placed over the insulating protector 23, a rotation operation alone is sufficient without performing position matching, and the workability is excellent. Furthermore, the number of parts can be reduced.

Also, according to the present embodiment, the first lock protrusion 36A and the second lock protrusion 36B to be locked to the insulating protector 23 are provided on the cover 33, and therefore movement of the temperature detection member 51 is restricted, and the state of contact between the detecting portion 54 and the bus bar 21 can be reliably maintained.

Other Embodiments

The technology disclosed in the present specification is not limited to the embodiment described using the foregoing description and drawings, and embodiments such as the following are also encompassed in the technical scope of the present invention.

(1) In the foregoing embodiment, the cover 33 and the insulating protector 23 are shown as being integrated, but the cover 33 and the insulating protector 23 may be separate bodies.

(2) In the foregoing embodiment, a configuration is employed where, in a state where the cover 33 covers the insulating protector 23, the cover 33 covers the detecting portion 54, and the region of the bus bar 21 that overlaps the electrode terminals 12 is exposed to the outside, but there is no limit to this, and the cover 33 may completely cover the bus bar 21. If such a configuration is employed, after the bus bar 21 and the electrode terminals 12 have been connected (e.g., through laser welding), the state of contact between the detecting portion 54 and the bus bar 21 can be held by arranging the temperature detection member 51 to overlap the bus bar 21, and closing the cover 33.

(3) In the foregoing embodiment, the cover 33 is shown to be provided with the lock protruding portions 36 that lock to the insulating protector 23, but the cover 33 may be one that does not have a structure in which it is locked to an insulating protector 23.

(4) In the foregoing embodiment, the detecting portion 54 is configured to be superimposed between a pair of regions where bus bars 21 overlap the electrode terminals 12A and 12B, but the regions superimposed by the bus bars 21 are not limited to those of the foregoing embodiment, and any region may be superimposed on provided that it is a region that does not interfere with the connection between a pair of electrode terminals and a bus bar.

(5) In the foregoing embodiment, a mode is shown where the bus bars 21 and the electrode terminals 12 are connected through laser welding, but there is no limit to this, and the technology disclosed in the present specification can also be applied to a mode where connection is performed using fasteners such as electrode posts and nuts, and nut-like electrode terminals and bolts, for example.

(6) The configuration of the temperature detection member 51 is not limited to that of the foregoing embodiment, and can be appropriately modified, that is to say, any configuration may be employed as long as it is a configuration that includes the detecting portion 54 that overlaps the bus bar 21, and the detecting portion 54 is pressed by a pressing portion provided on the cover 33.

REFERENCE SIGNS LIST

M: Battery module
10: Unit battery group (power storage element group)
11: Unit battery (power storage element)
12A, 12B: Electrode terminal
20: Wiring module
21: Bus bar
23: Insulating protector
24: Bus bar holding portion
25: Pass-through portion
30A, 30B: Cover locking hole
30A1: Locking portion
31: Receiving groove
32: Hinge
33: Cover
35A, 35B: Lock piece
36A, 36B: Lock protrusion (lock-target portion)
37: Extension portion
38: Pressing rib (pressing portion)
51: Temperature detection member
53: Element accommodating portion
54: Detection portion

The invention claimed is:

1. A wiring module configured to be attached to a power storage element group in which a plurality of power storage elements, each having a positive and a negative electrode terminal, are arranged side by side, the wiring module comprising:
a bus bar that overlaps the electrode terminals and electrically connects adjacent electrode terminals;
a temperature detection member having a plate-shaped detection portion that overlaps the bus bar, and detects a temperature of the bus bar;
an insulating protector that holds the bus bar and the temperature detection member; and a cover that covers at least a portion of the insulating protector,
wherein the detection portion overlaps a region of the bus bar other than a region of the bus bar that overlaps the electrode terminals, and
a pressing portion is provided on the cover, the pressing portion pressing the detection portion toward the bus bar in a condition in which the cover covers the insulating protector.

2. The wiring module according to claim 1, wherein, in a condition in which the cover covers the insulating protector, the cover covers the detection portion and exposes the region of the bus bar that overlaps the electrode terminals to the outside.

3. The wiring module according to claim 1, wherein the cover is provided integrated with the insulating protector via a hinge portion.

4. The wiring module according to claim 1, wherein a locking portion configured to be locked to the insulating protector is provided on the cover.

5. The wiring module according to claim 2, wherein the cover is provided integrated with the insulating protector via a hinge portion.

6. The wiring module according to claim 2, wherein a locking portion configured to be locked to the insulating protector is provided on the cover.

7. The wiring module according to claim 3, wherein a locking portion configured to be locked to the insulating protector is provided on the cover.

8. The wiring module according to claim 5, wherein a locking portion configured to be locked to the insulating protector is provided on the cover.

* * * * *